(12) United States Patent
Suchak

(10) Patent No.: US 8,871,166 B2
(45) Date of Patent: Oct. 28, 2014

(54) METHOD FOR REMOVING CONTAMINANTS FROM EXHAUST GASES

(71) Applicant: Naresh J. Suchak, Glen Rock, NJ (US)

(72) Inventor: Naresh J. Suchak, Glen Rock, NJ (US)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 14/151,948

(22) Filed: Jan. 10, 2014

(65) Prior Publication Data

US 2014/0199221 A1    Jul. 17, 2014

Related U.S. Application Data

(60) Provisional application No. 61/753,034, filed on Jan. 16, 2013.

(51) Int. Cl.
*B01D 53/56* (2006.01)
*B01D 53/68* (2006.01)

(52) U.S. Cl.
CPC .............. *B01D 53/56* (2013.01); *B01D 53/68* (2013.01)
USPC ..................................... 423/235; 423/240 R

(58) Field of Classification Search
USPC .............................................. 423/235, 240 R
See application file for complete search history.

(56) References Cited

U.S. PATENT DOCUMENTS

| | | |
|---|---|---|
| 5,206,002 A | 4/1993 | Skelley et al. |
| 5,985,223 A | 11/1999 | Saxena et al. |
| 6,162,409 A | 12/2000 | Skelley et al. |
| 6,649,132 B1 | 11/2003 | Hwang et al. |
| 7,303,735 B2 | 12/2007 | Suchak et al. |
| 8,795,620 B2 * | 8/2014 | Moore .......................... 423/235 |
| 2010/0254871 A1 * | 10/2010 | Foster et al. ................... 423/235 |

* cited by examiner

*Primary Examiner* — Timothy Vanoy
(74) *Attorney, Agent, or Firm* — Philip H. Von Neida

(57) ABSTRACT

A method for removing contaminants from the effluent from metal pickling operations by oxidizing the contaminants in the effluent, passing the oxidized effluent to a first scrubber thereby removing mixed acid vapors and some nitrogen oxides and passing these scrubbed gases to a second scrubbing system while injecting ozone into a duct between the first and the second scrubbing systems thereby to oxidize nitrogen oxides to higher oxides and scrubbing the oxidized nitrogen oxides gas stream in the second scrubbing system.

56 Claims, 4 Drawing Sheets

Pickling operations of S.S. Sheets retrofitted with oxygen assisted nitric acid recovery and ozone assisted NOx control

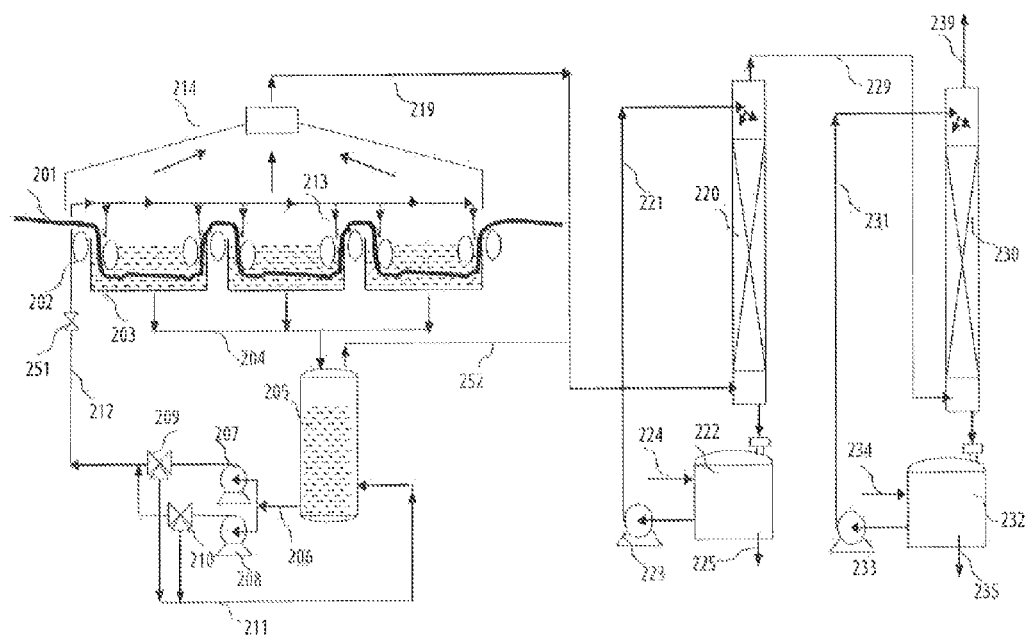
Figure 1 : Pickling operations of S.S. Sheets

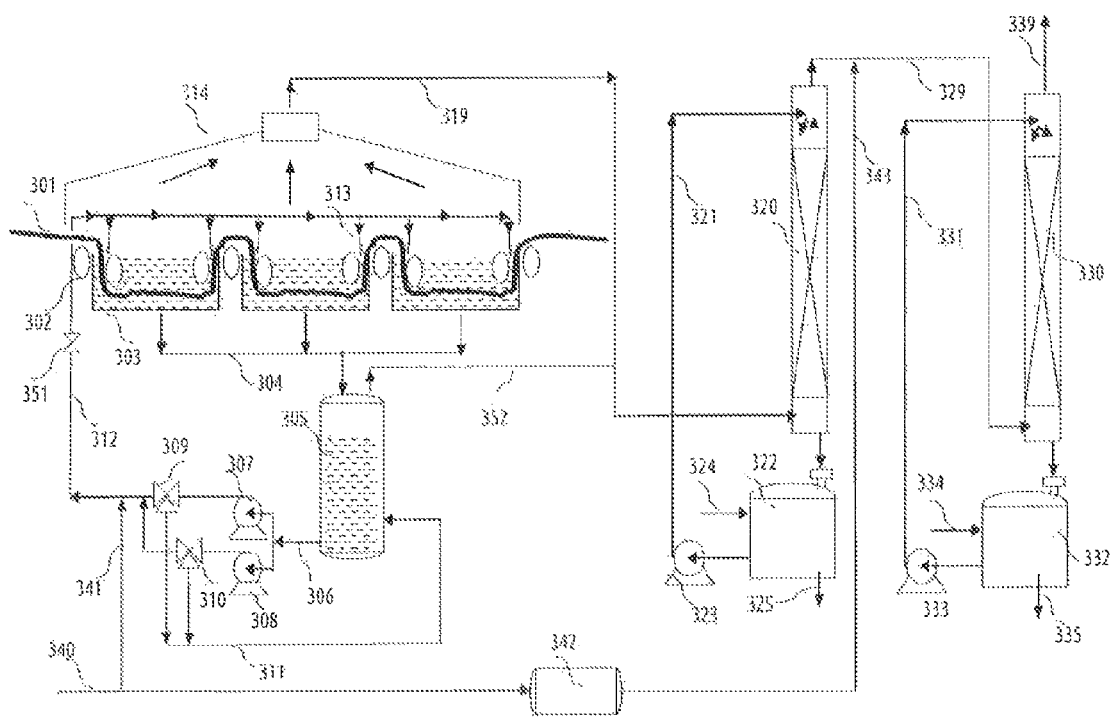
Figure 2 : Pickling operations of S.S. Sheets retrofitted with oxygen assisted nitric acid recovery and ozone assisted NOx control

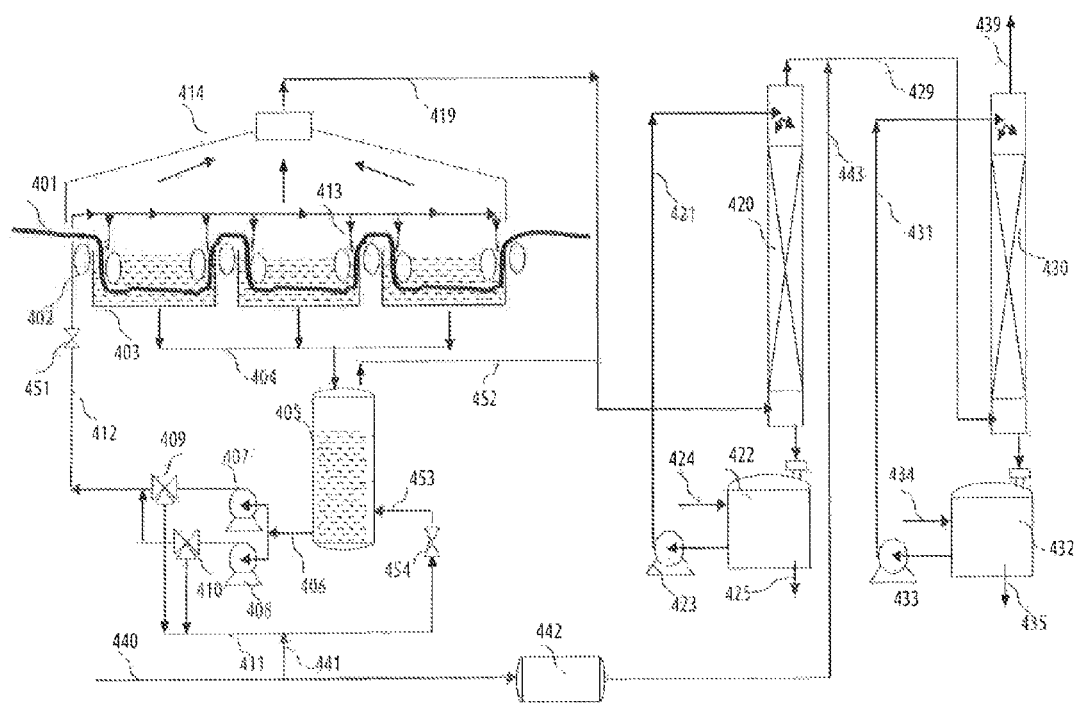
Figure 3 : Pickling operations of S.S. Sheets retrofitted with oxygen assisted nitric acid recovery and ozone assisted NOx control

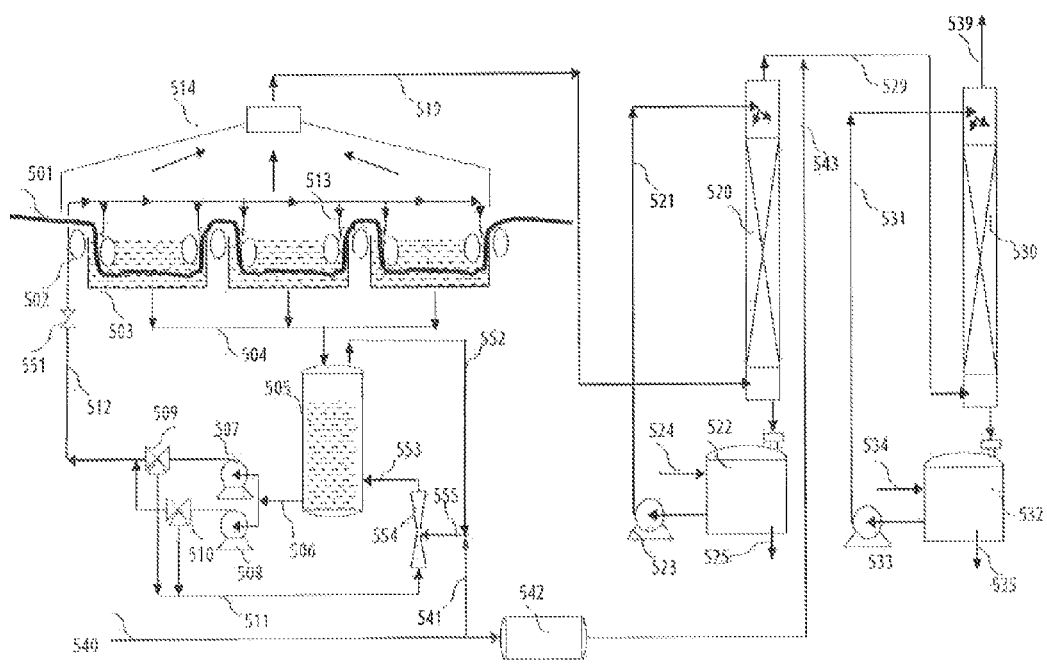
Figure 4 : Pickling operations of S.S. Sheets retrofitted with oxygen assisted nitric acid recovery and ozone assisted NOx control

METHOD FOR REMOVING CONTAMINANTS FROM EXHAUST GASES

CROSS REFERENCE TO RELATED APPLICATIONS

This application claims priority from U.S. provisional application Ser. No. 61/753,034 filed Jan. 16, 2013.

BACKGROUND OF THE INVENTION

The invention provides for a method for removing contaminants such as nitrogen oxides ($NO_x$), particulates, and acid gases such as HCl and HF from gas streams arising from pickling operations in cleaning metallurgical components or sheets.

Mixed acid pickling is an important step in making stainless steel sheets by removing imperfections and contamination on the surface. Prior to pickling, sheets are subjected to series of operations for surface preparation. Following the pickling step, sheets are subjected to a passivation step.

The surface preparation steps involve subjecting sheets to hot molten alkaline salts, washing with detergents and treating in mixed acid bath containing sulphuric acid. These operations remove and dislodge impurities and some imperfections.

Pickling of stainless steel consists of passing the material through a highly oxidizing chemical bath of nitric acid ($HNO_3$) and hydrofluoric acid (HF). Pickling aggressively removes any oxidized scale on the surface and prepares a smooth and continuous chromium oxide film.

Pickling is followed by passivation, which removes any free iron contaminants from the surface and develops a passive oxide film of chromium dioxide ($CrO_2$) rapidly on the surface which prevents further oxidation sites to initiate rust and scaling.

In pickling of metals, especially austenitic and ferrites steels, where mixture of nitric acid and hydrofluoric acid, pickling operations deplete nitric acid in the bath generating significant quantities of nitrogen oxides. Due to the elevated temperatures (>40° C.) required in pickling operations, there are substantial amounts of vapors of pickling acids that arise over the pickling bath. Nitrogen oxides and vapors of pickling acids are collected by hood over the pickling baths and conveyed by a duct to a scrubbing system. In case of pickling stainless steel sheets, metal strips are continuously fed to the pickling bath through a narrow opening between the bath and the hood where some air also slips or leaks into the hood. Wet scrubbing operations remove acid vapors and a small fraction of nitrogen oxides from the gaseous exhaust stream. Nitrogen oxides are sparingly soluble gases and only slightly reactive, therefore it is difficult to effectively remove nitrogen oxides by industrially employed aqueous scrubbing systems.

Many technologies are used to reduce nitrogen oxides emissions from pickling operations. The first category of these technologies deal with lowering nitrogen oxides formation in the pickling operations while the second category of technologies include scrubbing with various reagents for capturing and converting nitrogen oxides into soluble products.

The first set of technologies includes adding hydrogen peroxide, urea and bubbling or sparging of oxygen-containing gas stream such as air into the pickling bath. These techniques suppress nitrogen oxides generation in the pickling liquor of aqueous solution of mixed acids either by chemical oxidation or reduction. Adding hydrogen peroxide or urea into the pickling liquor not only alters the composition but also causes deviations in the quality and chemistry of pickling. Although reagent dosing technologies offer cheaper alternatives for nitrogen oxides control, they are not widely used due to an onerous analytical support requirement and poor control of pickling quality. Bubbling or sparging of an oxygen-containing gas is not very effective when used as the only treatment.

When nitric acid in the pickling solution depletes, it decomposes. The chemistry of this transformation of nitric acid into nitrogen oxides is somewhat complicated. Nitric acid decomposes into oxyacids such as nitrous acid and finally into oxides of nitrogen commonly referred to as $NO_x$. Nitrogen oxides being sparingly soluble, they are continuously released from pickling liquor during pickling operations to the gaseous phase residing over the pickling bath.

Adding reagents such as hydrogen peroxide or urea alters the chemical composition of the pickling liquor and suppresses NOx. Continuously and consistently characterizing the chemistry of the pickling liquor and monitoring the decomposition of nitric acid is challenging and difficult. Therefore, adding reagents to effectively suppress nitrogen oxides formation while maintaining the chemistry of pickling in real time is difficult. Any deviation affects the quality of pickling. Although these technologies offer lowering nitrogen oxides from pickling operations, they have limited success in pickling of the final product as it requires greater support from analytical chemistry to stay within the desired quality limits of pickling chemistry.

Some early patent literature also claims the use of compressed air sparging in the pickling bath along with use of hydrogen peroxide to lower NOx emissions. Oxygen in the air has very low solubility in the pickling liquor and therefore sparging air in the bath does not significantly lower NOx emissions. The present day practice is to use pickling tubs which have even lower liquid height than a classical pickling bath making air sparging even less effective. Additionally, it is known in the commercial manufacture of nitric acid, sparging air in the bleacher section enhances decomposition of oxyacids while converting only a very small portion of oxyacids to nitric acid which further corroborates limited effectiveness of sparging air (oxygen containing gas) directly into pickling bath.

The conventional nitrogen oxides control technologies such as SNCR (selective non catalytic reduction) and SCR (selective catalytic reduction) are also used in treating exhaust gas. Both SNCR and SCR require heating the gas stream from ambient to higher temperatures. SCR in particular is vulnerable to catalyst poisoning due to the occasional presence of acid gases such as HF when the acid gas scrubber malfunctions. Another approach is to use non selective reduction techniques using methane or natural gas. The energy cost in both selective and non selective methods is considerable though.

Pickling bath traditionally operates in the temperature range of 40 to 60° C. In order to implement SNCR or SCR, the exhaust gas stream from the pickling bath must be first scrubbed to remove halogen acid gas fumes (HCl or HF) and heated to the required temperature before subjecting it to SNCR or SCR technique. SNCR requires much higher temperatures and expensive capital equipment to implement. SCR is also equally expensive in terms of capital equipment but requires heating exhaust gas to a moderate temperature. The SCR catalyst is also prone to poisoning should halogen containing acid gas escape the wet scrubber. SCR is used with less than moderate success.

Wet chemical scrubbing is used with more moderate success. One or more chemical reagents are widely used to control NOx emissions. Reagents used are $H_2O_2$, caustic, sodium hydrosulphite, sodium chlorite and sodium sulphide in combination with caustic or alkali. Each one has its own set of limitations but in common, they require large size wet scrubbing apparatus, demand operational oversight to maintain performance, are costly in terms of reagents and produce huge quantity of aqueous waste that require elaborate processing in an effluent treatment facility. Most of these technologies are based on oxidizing or reducing NOx dissolved in the reagent medium in the wet scrubber. As mentioned earlier nitrogen oxides, consisting mainly of NO and $NO_2$, are sparingly soluble gases and therefore require scrubbers substantially large in size to dissolve even in the medium containing chemical reagents. Jethani et al. (1990) have reviewed chemical reagents used in wet scrubbing of NOx.

The use of ozone for oxidizing nitrogen oxides is described in U.S. Pat. Nos. 5,206,002; 6,162,409; 6,649,132; and 7,303,735. The methods described in these patents are useful for nitrogen oxides oxidation, absorption in nitric acid manufacture, mixed acid recovery and techniques for oxidizing nitrogen oxides with ozone. However, they are not as well suited for scrubbing nitrogen oxides in pickling operations due to their being relatively cost prohibitive due in part to the cost associated in producing large amounts of ozone.

Ozone based low temperature oxidation processes are based on the chemistry of nitrogen oxides reaction with ozone that forms higher oxides of nitrogen. Solubility of NOx increases considerably with oxidation and the pentavalent form is easily and almost completely removed by wet scrubbing. The stoichiometric amount of ozone required to convert one mole of NOx (in the form of NO) to a pentavalent form is about 1.5 moles of ozone and 0.5 moles if NOx is in the form of $NO_2$.

Ozone is an unstable gas and is generated on-site and on-demand using gaseous oxygen. The ozone generation is modulated rapidly based on amount of NOx present in the exhaust gas stream. Ozone generation is done in a well engineered system consisting of an ozone generating vessel and power supply unit. Ozone is produced by flowing an $O_2$ containing gas stream through a corona caused by electric discharges. Ozone in a high concentration can undergo rapid decomposition even leading to explosion. Most commercially available generators provide 8 to 12 wt % conversion of oxygen to ozone. For making 1 kg of ozone with current state of art technologies, 10 to 12 KW/Hr of power is required to obtain 10 wt % conversions.

Various ozone based methods described in the aforementioned patents are very robust and extremely effective in achieving ultra low levels of NOx. A typical exhaust from pickling bath has NOx contents in the range of 1000 to 4000 PPM by volume. In order to cause effective removal 1.5 moles of ozone per every mole of NO and 0.5 moles per every mole of $NO_2$ is required. The typical NO to $NO_2$ ratio in pickling is 60:40 requiring an addition of ozone that would be equivalent to 0.44 volume % of the exhaust gas flow. This is way too much ozone and turns out to be a huge quantity for an average production scale facility. Ozone generation is expensive both in capital and operating costs. On-site generation requires large sum of fixed capital. Operating costs include heavy consumption of power and oxygen. Due to these very high operating and capital costs, the use is limited. Any attempt to reduce this ozone requirement can make ozone oxidation approach commercially attractive.

The methods described by this invention recover part of the nitric acid by regenerating it in situ within the pickling operations thereby lowering concentration of NOx in the exhaust (effluent) stream leaving the pickling bath. As per this invention the NOx leaving the bath are substantially in the form of $NO_2$ which requires only one third the amount of ozone to react compared to NO thus requiring significantly lower amounts of ozone. The invention also offers an option of using single wet scrubber eliminating need of an oxidation reactor or duct and the wet second scrubber.

Although various ozone based methods described in the aforementioned patents are very effective in achieving ultra low levels of nitrogen oxides emissions in the treated gas stream, they possess challenges with respect to economics and disposing of large amounts of effluent produced in removing nitrogen oxides. The method described for the present invention reduces the amount of ozone required, recovers part of the nitric acid by regenerating in situ and significantly reduces the amount of waste effluent generated.

SUMMARY OF THE INVENTION

In one embodiment of the invention, there is disclosed a method for removing contaminants from an effluent stream from a metal pickling operation comprising the steps:

a) injecting a measured amount of gaseous oxygen into a pickling solution in the metal pickling operation wherein the oxygen will oxidize the reaction products of nitric acid and metal in the pickling solution forming nitrogen oxides and regenerate the nitric acid;

b) adding additional oxygen into the pickling solution to further reduce the depletion of nitric acid in the pickling solution;

c) adding gaseous oxygen to the effluent stream which comprises pickling acid vapors and the nitrogen oxides formed in step a) wherein the gaseous oxygen is added in a controlled manner;

d) collecting and conveying the effluent stream to a first scrubbing system wherein the acid gas and nitrogen oxides are removed from the effluent stream;

e) conveying the effluent stream by way of a duct to a second scrubbing system;

f) injecting ozone into the duct between the first scrubbing system and the second scrubbing system, thereby mixing with the effluent stream to oxidize the remaining nitrogen oxides; and g) scrubbing the oxidized nitrogen oxides in the effluent stream in the second scrubbing system.

The pickling bath will typically contain nitric acid and hydrofluoric acid as the active ingredients. The pickling acid vapors will thus comprise nitric acid and hydrofluoric acid which will be collected and conveyed by a hood and duct assembly to the scrubbing system.

The measured amount of gaseous oxygen injected into the pickling solution is at least one fourth in weight of $HNO_3$ consumed otherwise in the pickling operation or one third in weight of NOx arising from bath. The reaction products of the nitric acid include nitrous acid among others. The nitrous acid will react with the injected oxygen to form nitric acid.

The additional oxygen is added in a manner such that it is soluble in the pickling solution. The gaseous oxygen is injected at high pressure. The gaseous oxygen may also be injected into the pickling solution through a venturi device. The additional oxygen will react with the nitrous acid forming continuously in the pickling solution due to presence of dislodged oxides and imperfections from metal surfaces.

The controlled manner in which the gaseous oxygen is added to the effluent stream is selected from the group consisting of oxidation reduction potential using on-line instrumentation of the pickling solution, by measuring the level of nitrogen oxides in the gaseous exhaust stream or simply by measuring and monitoring oxygen gas flow. Nitric acid decomposition products if any in the pickling bath not oxidized by dissolved oxygen will release from the surface along with excess oxygen and quickly oxidize to nitrogen oxides to $NO_2$ prior to mixing with air slipping in the hood. Therefore nitrogen oxides arising from the bath will typically be in the form of $NO_2$.

The first scrubbing system is a wet scrubbing system with a caustic or alkaline solution. The second scrubbing system is also a wet scrubbing system with a caustic or alkaline solution.

An ozone generator is in fluid communication with the duct and the ozone is injected into the duct in a range of about 2% to about 12% by weight ozone. The amount of ozone that is injected into the duct is controlled by measuring the nitrogen oxides concentration upstream of the ozone injection and downstream of the second, when present scrubbing system. The ozone will be present in the duct for a sufficient amount of time for the ozone to convert the nitrogen oxides to $N_2O_5$.

In another embodiment of the invention, there is disclosed a method for removing contaminants from an effluent stream from a metal pickling operation comprising the steps:
a) injecting a measured amount of gaseous oxygen into a pickling solution in the metal pickling operation wherein the oxygen will oxidize the reaction products of nitric acid and metal in the pickling solution forming nitrogen oxides and regenerate the nitric acid;
b) adding additional oxygen into the pickling solution to further reduce the depletion of nitric acid in the pickling solution;
c) adding gaseous oxygen to the effluent stream which comprises pickling acid vapors and the nitrogen oxides formed in step a) wherein the gaseous oxygen is added in a controlled manner;
d) collecting and conveying the effluent stream to a duct;
e) injecting ozone into the duct thereby mixing the effluent stream and ozone to oxidize the nitrogen oxides; and
f) feeding the effluent stream to a first scrubbing system wherein the acid gas and nitrogen oxides are removed from the effluent stream.

In a further embodiment of the invention, there is disclosed a method for removing contaminants from an effluent stream from nitric acid based oxidation of chemicals selected from the group consisting of inorganic and organic chemicals process comprising the steps:
a) injecting a measured amount of gaseous oxygen into a solution in the nitric acid based oxidation process wherein the oxygen will oxidize the reaction products of nitric acid and the chemicals in the solution forming nitrogen oxides and regenerate the nitric acid;
b) adding additional oxygen into the solution to further reduce the depletion of nitric acid in the solution;
c) adding gaseous oxygen to the effluent stream which comprises acid vapors and the nitrogen oxides formed in step a) wherein the gaseous oxygen is added in a controlled manner;
d) collecting and conveying the effluent stream to a first scrubbing system wherein acid gas and nitrogen oxides are removed from the effluent stream;
e) conveying the effluent stream by way of a duct to a second scrubbing system;
f) injecting ozone into the duct between the first scrubbing system and the second scrubbing system, thereby mixing with the effluent stream to oxidize the remaining nitrogen oxides; and
g) scrubbing the oxidized nitrogen oxides in the effluent stream in the second scrubbing system.

The present invention provides for a method for removing contaminants such as nitrogen oxides, particulates, acid gases, sulfur oxides if present, HF, and HCl from the effluent from metal pickling operations. The method provides an efficient, cost effective operation that regenerates nitric acid as well and reduces the amount of waste effluents generated.

The present invention provides for an improved method of removing NOx and other contaminants from the gaseous stream arising from pickling baths and other chemical processes which not only lowers both operating and capital costs but reduces the liquid effluent generated in pickling and scrubbing operations.

Unlike the prior art this invention proposes oxidation of NOx partially with gaseous oxygen in the pickling operations and lowering both nitric acid consumption and concentration of NOx in the fumes arising from the bath. In addition NOx arising from the bath is in an oxidized form, mainly as $NO_2$ which requires only half a mole of ozone per mole of $NO_2$ to transform into the pentavalent form. Furthermore, in one option, ozone may be injected into the portion of the duct upstream of the acid gas scrubber eliminating the need of gas phase reactor and the second scrubber for NOx removal.

BRIEF DESCRIPTION OF THE DRAWINGS

FIG. 1 is a schematic of a pickling operation for the treatment of steel sheets.

FIG. 2 is a schematic of a pickling operation for steel sheets and associated wet scrubbing system fitted with the present invention.

FIG. 3 is a schematic of a pickling operation for steel sheets with oxygen assisted nitric acid recovery and ozone assisted nitrogen oxides control.

FIG. 4 is a schematic of a pickling operation for steel sheets retrofitted with oxygen assisted nitric acid recovery and ozone assisted nitrogen oxides control.

DETAILED DESCRIPTION OF THE INVENTION

FIG. 1 depicts the pickling operations of steel sheets and associated wet scrubbing system commonly practiced in the industry. Steel strips or sheets 201 are continuously fed through a narrow opening below hood 214 and above pickling bath 203. Guide rollers 202 convey the sheet through the pickling bath which may be either a tank or tubs (as shown here are tubs). The industry trend is toward use of shallow tubs rather than deeper tanks. These tubs continuously drain pickling liquor in the receiving tank 205 which is circulated back to the tub by pumps 207 and 208 connected via line 212 and sprayed by set of nozzles 213 above or below surface of pickling liquor on the metal strips. Valves 209 and 210 are three way valves that enable the pickling liquor to either flow to tub or bath via line 212 or 211 circulate back to the tank bypassing tubs. The valve 251 is an isolation valve. Temperature of the pickling liquor is maintained by heating coils (not shown here) in tank 205 or heat exchanger (not shown here) in the line 211.

Pickling of the steel strip is carried out in the range of 40° C. and 60° C. typically with a mixture of HF and $HNO_3$ of concentrations (2 to 6%) and (10 to 25%) by weight respectively. Pickling removes imperfections and scales and forms a layer of chromium oxide when stainless steel is the subject of the pickling operation. Pickling causes the generation of significant amount of acid fumes over the tub. Some nitric acid also undergoes decomposition in oxidizing metals to metal oxides. These fumes over the tub are vapours of HF, $HNO_3$ and $NO_x$ gases. These fumes are collected by a fume hood covering the entire bath. Sheets are fed through a narrow opening for entering and exiting the bath. The fume hood is maintained under suction to evacuate and leak air in the hood to prevent toxic and corrosive fumes of acid escaping the pickling operations. The fumes are conveyed by an exhaust duct 219 to scrubbing system consisting of several stages.

The first stage of the scrubbing system is wet scrubbing of acid vapours preferably with neutralizing medium such as caustic or alkaline solution. Shown in FIG. 1 is a packed column 220 scrubber with recirculation tank 222 fed with caustic solution by line 224. The scrubbing medium from the tank 222 is recirculated in the packed scrubber by pump 223 via line 221 to the top of the packed section. Gases from duct 219 are scrubbed in the packed column 220 in a counter current fashion and conveyed via duct 229 to the second stage of scrubbing in a packed column 230 with a recirculation tank 232 fed with chemical solution by line 234. The scrubbing medium from the tank 232 is recirculated in the packed scrubber by pump 233 via line 231 to the top of the packed section. Gases from duct 229 are scrubbed in the packed column 230 in a counter current fashion and conveyed to the next chemical scrubber (not shown) by duct 239 or exhausted to the stack. The second stage and following stage(s) are specifically for removal of $NO_X$ by oxidative and reductive reagents.

Alternatively for $NO_X$ removal, instead of routing the gas stream via duct 229 to scrubber 230, the gas stream is ducted to a heat exchanger (alternative approach not shown in the FIG. 1), where it is heated to about 350° C. and mixed with ammonia and NOx is reduced in an SCR system before exhausting to the atmosphere.

During pickling operations, nitric acid is utilized for oxidizing chromium and other metals on the surface and dislodge imperfections. Nitric acid is a strong oxidizing agent and oxidizes metals and metal oxides, to form $Ni^{2+}$, $Cr^{3+}$ and $Fe^{3+}$ ions. Nitric acid undergoes decomposition to form in part NOx. A very simplified explanation to decomposition of nitric acid is provided by equation (1).

$$HNO_3 \rightarrow HNO_2 + [O] \quad (1)$$

The chemistry of pickling is complicated where hydrofluoric acid and nitric acid in pickling solutions also form fluoride and nitrate salts. While attention is directed to the NOx generation in the acidic pH, nitrous acid formed during the pickling operation undergoes decomposition and forms NOx (NO and $NO_2$) as per equation (2).

$$HNO_2 \leftrightarrow NO + NO_2 + H_2 \quad (2)$$

The solubilities of NO and $NO_2$ as well are very low in water and they desorb as the concentration of dissolved NOx crosses saturation value at pickling conditions. The mechanism of decomposition of $HNO_2$ is complicated and for the sake of brevity, the reaction in the equation (2) is the simplified form.

A small fraction of $NO_2$ evolving from pickling bath dissolves to form nitric acid and nitrous acid.

$$2NO_2 + H_2O \rightarrow HNO_3 + HNO_2 \quad (3)$$

The presence of HF and nitrate and fluoride salts of various metals lowers the solubility of NOx and any agitation accelerates desorption of dissolved NO and $NO_2$ and drives decomposition of $HNO_2$ as per the equilibrium stated in equation (2). Therefore, it is observed that when pumps 208 and 207 are restarted after any brief interruption, significant amount of NOx arises from the pickling bath.

Attempts have been made to convert $HNO_2$ to $HNO_3$ by bubbling or sparging air in the bath as per reaction in equations (4a) and (4b) and injecting $H_2O_2$ as per reaction in the equation (5) to reduce $HNO_2$ decomposition. Only bubbling or sparging air accelerates the reaction in equation (2) rather than oxidizing $HNO_2$ to $HNO_3$ as per reaction in equations (4a) and (4b).

$$O_2(g) \leftrightarrow O_2(l) \quad (4a)$$

$$2HNO_2 + O_2(l) \rightarrow 2HNO_3 \quad (4b)$$

$$HNO_2 + H_2O_2 \rightarrow HNO_3 + H_2O \quad (5)$$

Injecting $H_2O_2$ is somewhat effective in reducing $HNO_2$ decomposition but maintaining quality control in pickling and characterizing chemistry remains challenging. Air bubbling or sparging along with injection of $H_2O_2$ does not have noticeable advantages and further complicates pickling operations.

As per this invention, oxygen is injected in the pickling solution which is circulated to the bath or receiving tank. Oxygen is introduced on the discharge side of the pump in the circulation loop. The discharge side is always the higher pressure side and therefore part of the oxygen dissolves in the pickling liquor. Dissolved oxygen transforms nitrous acid to nitric acid as per the reaction in equation (4b). Due to agitation in the pickling liquor caused by pumps, NOx desorbs from pickling liquor in the recirculation line forming bubbles. Oxygen introduced in this liquor mixes with NOx bubbles. Oxygen oxidizes NOx in the bubbles as per equation (6). Oxidation is rapid since this reaction is second order with respect to nitric oxide (NO) and first order with respect to oxygen and NOx and oxygen account for over 90% of the gas content in the bubble. Higher pressure on the discharge side also significantly enhances the oxidation reaction in the bubbles.

$$2NO + O_2 \rightarrow 2NO_2 \quad (6)$$

Due to higher overall pressure in the pickling liquor and very high NOx content in the bubbles, a substantial amount of $NO_2$ dimerizes to form $N_2O_4$ as per the equilibrium in equation (7).

$$2NO_2 \leftrightarrow N_2O_4 \quad (7)$$

The solubility of $N_2O_4$ is estimated to be in excess of fifty to seventy times that of $NO_2$ under identical conditions. As $N_2O_4$ thus formed within bubbles dissolves in the pickling liquor, more of it is formed while maintaining the equilibrium (as per the equation (7)). The dissolution of $N_2O_4$ in the aqueous solution is well characterized as per equation (8) and lot more is described in the technical literature for nitric acid manufacture by Suchak et al. (1990, 1991, 1994, 1997).

$$N_2O_4 + H_2O \rightarrow HNO_3 + HNO_2 \quad (8)$$

A small quantity of $NO_2$ in the bubbles dissolves in the pickling liquor forming nitric acid as per reactions (3) and (4). The fraction of $NO_2$ that did not dissolve in the pickling liquor is collected in the hood and mixed with ozone to convert to $N_2O_5$ (pentavalent form) and scrubbed. For effective oxidation and dissolution of $O_2$ and NOx, the pressure on the discharge side is maintained as high as possible, the amount of oxygen is controlled by gas flow monitoring and recirculation loop extended in length to provide the required residence time.

Due to higher pressure maintained in the circulation loop, appreciable quantity of gaseous oxygen also dissolves as per equation 4(a), improving oxidation of nitrous acid in the liquid phase and making reaction as per 4(b) effective.

As per this invention, the remainder of NOx that did not dissolve in the pickling liquor is released from the pickling bath and this $NO_X$ is substantially in the form of $NO_2$. Fumes and NOx are carried with leaked in air via a duct to the wet scrubber. Ozone is injected into the duct to oxidize NOx to a pentavalent form ($N_2O_5$) as per reactions in equations (9) and (10). The duct from pickling bath/tub to the scrubber is usually long enough in length to provide the required residence time for ozone to oxidize NOx.

$$NO + O_3 \rightarrow NO_2 + O_2 \qquad (9)$$

$$2NO_2 + O_3 \rightarrow N_2O_5 + O_2 \qquad (10)$$

The pentavalent form of NOx is extremely soluble in water and readily scrubbed in a wet scrubber as per the equation (11) to form nitric acid.

$$N_2O_5 + H_2O \rightarrow 2HNO_3 \qquad (11)$$

Vapors of mixed acid HF and $HNO_3$ in the gas stream also dissolve in the circulating scrubbing medium in the wet scrubber and neutralized with the alkali or alkaline earth metal hydroxides or carbonates as per reactions in equations (12) and (13).

$$HNO_3 + NaOH \rightarrow NaNO_3 + H_2O \qquad (12)$$

$$HF + NaOH \rightarrow NaF + H_2O \qquad (13)$$

Instead of NaOH, KOH is often preferred to avoid precipitation of solids in the scrubber. The circulation medium is periodically or continuously purged and replenished to maintain efficiency of the scrubbing.

In the existing pickling line with two or more wet scrubbers, acid vapours and some NOx may be scrubbed in the first scrubber by alkali or alkaline hydroxides and carbonates as per equation (12), (13) and (14).

$$2NO_2 + 2NaOH \rightarrow NaNO_3 + NaNO_2 + H_2O \qquad (14)$$

Ozone is then added to the prescrubbed gas stream in the duct between two scrubbers to oxidize any remaining NOx to $N_2O_5$ and scrubbed with alkali or alkaline hydroxides and carbonates as per equation (12).

In the prior art, when an air or oxygen containing gas stream is injected, bubbled or sparged into the bath, agitation causes degassing of the NOx from pickling liquor over the entire bath. A substantial fraction of rising NOx bubbles may not even coalesce with air or oxygen containing gas bubbles. For the fraction that did coalesce with air bubbles, it may not be optimum for the reaction in equation (6). The time in which bubbles travel to the surface and disengage is too short for oxygen to dissolve in pickling liquor, nitric oxide (NOx) to oxidize to $NO_2$ and form $N_2O_4$ and absorb as per the reactions in equations (6), (7) and (8) respectively. Additionally, since the bath is at atmospheric pressure and so are the bubbles arising from the bath, this reduces the intensity of chemical oxidation and dimerization reaction per equations (6), (7) and consecutive absorption as per equation (8). The gaseous space above the pickling bath is maintained under suction and once NOx escapes the surface of pickling liquor in the space above, it mixes with large excess of air. On dilution with air, NOx concentration is reduced to a fraction of a volume percent. The reaction in the equation (6) is second order with respect to nitric oxide (NO) concentration which makes oxidation of diluted NOx in air extremely slow and insignificant in the surface above pickling liquor in the tub/bath under the hood.

Compared to simply bubbling air into the bath, this invention can improve efficiency of recovering nitric acid and reduction in NOx generation in pickling bath by up to 80%.

Having described the existing practice in pickling of steel strips and the principle of the invention in this disclosure, the invention relates to a method for removing contaminants from metal pickling operations comprising the steps:

Injecting a measured amount of gaseous oxygen into a pickling solution to oxidize the reaction products of nitric acid and metal in the pickling solution thereby forming nitrogen oxides while regenerating the nitric acid in the pickling bath;

Adding additional oxygen into the pickling solution to further reduce the depletion of the nitric acid in the pickling bath by reacting the oxygen with the nitrous acid to form nitric acid;

Adding gaseous oxygen to the effluent stream above the pickling solution which comprises pickling acid vapours and the nitrogen oxides by adding the gaseous oxygen in a controlled manner;

Collecting the effluent stream to a first scrubbing system to remove acid gas and nitrogen oxides from the effluent stream and feeding the effluent stream to a duct; and Injecting ozone into the duct thereby reacting the ozone with the nitrogen oxides before feeding the effluent stream with the oxidized nitrogen oxides to a second scrubbing system.

FIG. 2 depicts the pickling operations of steel sheets and associated wet scrubbing system retrofitted with the methods of this invention.

Steel strips 301 are continuously fed through a narrow opening below hood 314 and above pickling bath 303. Guide rollers 302 convey the sheet or strips through a pickling bath which may be either a tank or tubs (as shown here, tubs). The industry prefers using shallow tubs rather than deeper tanks. These tubs continuously drain pickling liquor into the receiving tank 305 by drain line 304 which is circulated back to the tub by pumps 307 and 308 connected via line 312 and sprayed by set of nozzles 313 onto the metal strips. Valves 309 and 310 are three way valves that enable the pickling liquor to either flow to line 312 or 311 respectively and circulate back to the tank bypassing tubs. The valve 351 is an isolation valve. The temperature of the pickling liquor is maintained by heating coils (not shown here) in tank 305 or a heat exchanger (not shown here) in the line 311. Line 352 conveys NOx arising from tank 305 to exhaust line 319. Oxygen from the header 340 is injected by line 341 into the pickling liquor recirculation line 312. Pumps 307 and 308 may need to be up sized for higher pressure and line 312 and length of piping in 312 may be increased to provide sufficient residence time. Valve 351 is modulated to maintain flow while retaining pressure in line 312. It is line 312 where the injected oxygen oxidizes NOx to form $N_2O_4$ which in turn forms nitric acid in-situ in the pickling solution. Oxygen dissolution under high pressure in line 312 also increases dissolved oxygen content thereby reducing decomposition of $HNO_2$.

The fume hood 314 is maintained under suction to evacuate and leak air in the hood to prevent toxic and corrosive fumes of acid escaping the pickling operations. The fumes are conveyed by exhaust duct 319 to a scrubbing system consisting of several stages. The first stage invariably is wet scrubbing of acid vapours preferably with caustic or alkaline solution. Shown in the FIG. 2 is a packed column 320 scrubber with recirculation tank 322 fed with caustic solution by line 324. The scrubbing medium from the tank 322 is recirculated in the packed scrubber by pump 323 via line 321 to the top of the packed section. Gases from duct 319 are scrubbed in the packed column 320 in a counter current fashion and conveyed via duct 329 to the second stage of scrubbing.

Oxygen is supplied from header 340 to ozone generator 342 which converts about 2 to 12% of oxygen by weight into the ozone stream 343. In the duct 329, ozone containing oxygen stream 343 is uniformly distributed over the entire flow area to cause oxidation of NOx to $N_2O_5$. Sufficient residence time is provided to oxidize almost all the NOx to $N_2O_5$. Unlike the prior art processes, the amount of ozone required as per this invention is minimal since a large fraction of NOx is in the form of $NO_2$. The oxidized stream via duct 329 is then conveyed to the packed column 330 with a recirculation tank 332. Neutralizing reagents such as alkali or alkaline earth metal hydroxides or carbonates are fed by line 334 to the tank 332 to maintain required pH. The scrubbing medium from the tank 332 is recirculated in the packed scrubber by pump 333 via line 331 to the top of the packed section. Gases from duct 329 are scrubbed in the packed column 330 in a counter current fashion and the treated gas stream substantially free from NOx and acid vapours leaving packed column 330 is exhausted to the stack via fan (not shown). The method described in this invention saves up to 70% of total cost (consisting of fixed and variable costs).

FIG. 3 depicts pickling operations of steel sheets and associated wet scrubbing system retrofitted with another embodiment of this invention.

Steel strips 401 are continuously fed through a narrow opening below hood 414 and above pickling bath 403. Guide rollers 402 convey the sheet through pickling bath which may be either a tank or tubs (as shown here, tubs). The industry prefers using shallow tubs rather than deeper tanks. These tubs continuously drain pickling liquor into the receiving tank 405 by drain line 404 which is circulated back to the tub by pumps 407 and 408 connected via line 412 and sprayed by a set of nozzles 413 on the metal strips. Valves 409 and 410 are three way valves that enable the pickling liquor to either flow to line 412 or 411 respectively to circulate back to the tank bypassing tubs. The valve 451 is an isolation valve. Temperature of the pickling liquor is maintained by heating coils (not shown here) in tank 405 or heat exchanger (not shown here) in the line 411. Oxygen from the header 440 is injected by line 441 into the pickling liquor recirculation line 411. Pumps 407 and 408 may need to be up sized for higher pressure in line 411 and length of piping in 411 increased to provide sufficient residence time. Valve 454 is modulated to maintain flow while retaining pressure in line 411. It is line 411 where injected oxygen oxidizes NOx to form $N_2O_4$ which in turn forms nitric acid in-situ in the pickling solution. Oxygen dissolution under high pressure in 411 also increases dissolved oxygen reducing decomposition of $HNO_3$. Due to oxygenation of pickling liquor NOx arising from tank 405 in line 452 is also minimized.

The fume hood 414 is maintained under suction to evacuate and leak air into the hood to prevent toxic and corrosive fumes of acid escaping the pickling operations. The fumes are conveyed by exhaust duct 419 to the scrubbing system consisting of several stages. The first stage invariably is wet scrubbing of acid vapours preferably with caustic or alkaline solution. Shown in FIG. 3 is a packed column 420 scrubber with recirculation tank 422 fed with caustic solution by line 424. The scrubbing medium from the tank 422 is recirculated in the packed scrubber by pump 423 via line 421 to the top of the packed section. Gases from duct 419 are scrubbed in the packed column 420 in a counter current fashion and conveyed via duct 429 to the second stage of scrubbing.

Oxygen is supplied from header 440 to ozone generator 442 which converts about 2 to 12% of oxygen by weight into ozone stream 443. In the duct 429, ozone containing oxygen stream 443 is uniformly distributed over the entire flow area to cause oxidation of NOx to $N_2O_5$. Sufficient residence time is provided to oxidize almost all the $NO_x$ to $N_2O_5$. Unlike the prior art processes, the amount of ozone required as per this invention is minimal since a large fraction of NOx is in the form of $NO_2$. The oxidized stream via duct 429 is then conveyed to the packed column 430 with a recirculation tank 432. Neutralizing reagents such as alkali or alkaline earth metal hydroxides or carbonates are fed by line 434 to the tank 432 to maintain the required pH. The scrubbing medium from the tank 432 is recirculated into the packed scrubber by pump 433 via line 431 to the top of the packed section. Gases from duct 429 are scrubbed in the packed column 430 in a counter current fashion and the treated gas stream substantially free from NOx and acid vapours leaving packed column 430 is exhausted to the stack via fan (not shown). The method described in this invention saves up to 70% of total cost (consisting of fixed and variable costs).

FIG. 4 depicts pickling operations of steel sheets and associated wet scrubbing system retrofitted with another embodiment of this invention.

Steel strips 501 are continuously fed through a narrow opening below hood 514 and above pickling bath 503. Guide rollers 502 convey the sheet or strip through pickling bath which may be either a tank or tubs (as shown here, tubs). The industry prefers using shallow tubs rather than deeper tanks. These tubs continuously drain pickling liquor into the receiving tank 505 by drain line 504 which is circulated back to the tubs by pumps 507 and 508 connected via line 512 and sprayed by set of nozzles 513 on the metal strips. Valves 509 and 510 are three way valves that enable the pickling liquor to either flow to line 512 or 511 circulate back to the tank bypassing tubs. The valve 551 is an isolation valve. The temperature of the pickling liquor is maintained by heating coils (not shown here) in tank 505 or heat exchanger (not shown here) in the line 511. The oxygen from the header 540 is mixed with line 552, the gas exhaust from tank 505 to form line 555 which is then injected into the throat of the venturi nozzle 554.

Pickling liquor through recirculation line 511 is fed to the inlet of the venturi nozzle 554. The venturi nozzle disperses the gas from line 555 into the pickling liquor from 511 to form finely dispersed gas bubbles providing a relatively enormous area for mass transfer. Since gas arising from 505 is recycled back via line 552, pumps 507 and 508 may not be up sized. The pressure in line 511 does not require being significantly high and the length of piping in 511 is no longer a limiting factor for providing the required NOx oxidation and nitric acid recovery. The lack of high pressure is compensated for by high surface are offered by a venturi nozzle 554. It is in the pickling solution in line 553 where dispersed oxygen oxidizes NOx to form $N_2O_4$ which in turn forms nitric acid in the tank 505. Oxygen dissolution is achieved by enhanced mass transfer due to large gas-liquid surface area rather than pressure. For efficient oxidation, the vapour space of tank 505 also provides additional residence time.

The fume hood 514 is maintained under suction to evacuate and leak air in the hood to prevent toxic and corrosive fumes of acid escaping the pickling operations. The fumes are conveyed by exhaust duct 519 to a scrubbing system consisting of several stages. The first stage invariably is wet scrubbing of acid vapours preferably with caustic or alkaline solution. Shown in FIG. 4 is a packed column 520 scrubber with recirculation tank 522 fed with caustic solution by line 524. The scrubbing medium from the tank 522 is recirculated in the packed scrubber by pump 523 via line 521 to the top of the packed section. Gases from duct 519 are scrubbed in the packed column 520 in a counter current fashion and conveyed via duct 529 to a second stage of scrubbing.

Oxygen is supplied from header 540 to ozone generator 542 which converts about 2 to 12% of oxygen by weight into ozone stream 543. In the duct 529, ozone containing oxygen stream 543 is uniformly distributed over the entire flow area to cause oxidation of NOx to $N_2O_5$. Sufficient residence time is provided to oxidize almost all NOx to $N_2O_5$. Unlike the prior art processes, the amount of ozone required as per this invention is minimal since a large fraction of NOx is in the form of $NO_2$. The oxidized stream via duct 529 is then conveyed to the packed column 530 with a recirculation tank 532. Neutralizing reagents such as alkali or alkaline earth metal hydroxides or carbonates are fed by line 534 to the tank 532 to maintain the required pH. The scrubbing medium from the tank 532 is recirculated in the packed scrubber by pump 533 via line 531 to the top of the packed section. The gases from duct 529 are scrubbed in the packed column 530 in a counter current fashion and treated gas stream substantially free from NOx and acid vapours leaving packed column 530 is exhausted to the stack via fan (not shown).

The different embodiments described for the methods of this invention can save up to 70% of total cost (consisting of fixed and variable costs) compared with traditional methods for treating the effluent stream from a pickling process.

While this invention has been described with respect to particular embodiments thereof, it is apparent that numerous other forms and modifications of the invention will be obvious to those skilled in the art. The appended claims in this invention generally should be construed to cover all such obvious forms and modifications which are within the true spirit and scope of the present invention.

Having thus described the invention, what I claim is:

1. A method for removing contaminants from an effluent stream from a metal pickling operation comprising the steps:
    a) injecting a measured amount of gaseous oxygen into a pickling solution in the metal pickling operation wherein the oxygen will oxidize the reaction products of nitric acid and metal in the pickling solution forming nitrogen oxides and regenerate the nitric acid;
    b) adding additional oxygen into the pickling solution to further reduce the depletion of nitric acid in the pickling solution;
    c) adding gaseous oxygen to the effluent stream which comprises pickling acid vapors and the nitrogen oxides formed in step a) wherein the gaseous oxygen is added in a controlled manner;
    d) collecting and conveying the effluent stream to a first scrubbing system wherein acid gas and nitrogen oxides are removed from the effluent stream;
    e) conveying the effluent stream by way of a duct to a second scrubbing system;
    f) injecting ozone into the duct between the first scrubbing system and the second scrubbing system, thereby mixing with the effluent stream to oxidize the remaining nitrogen oxides; and
    g) scrubbing the oxidized nitrogen oxides in the effluent stream in the second scrubbing system.

2. The method as claimed in claim 1 wherein the pickling bath comprises nitric acid and hydrofluoric acid.

3. The method as claimed in claim 1 wherein the measured amount of gaseous oxygen injected into the pickling solution is determined by a method selected from the group consisting of at least one fourth in weight of $HNO_3$ consumed otherwise in the pickling operation or one third of NOx in weight arising from the pickling bath, whichever is less.

4. The method as claimed in claim 1 wherein the reaction products of nitric acid are nitrous acid.

5. The method as claimed in claim 1 wherein the nitrous acid reacts with oxygen dissolved in the pickling solution to regenerate nitric acid.

6. The method as claimed in claim 1 wherein the gaseous oxygen is injected into the pickling solution at high pressure.

7. The method as claimed in claim 1 wherein the gaseous oxygen is injected into the pickling solution through a venturi device.

8. The method as claimed in claim 1 wherein the additional oxygen is soluble in the pickling solution.

9. The method as claimed in claim 1 wherein the additional oxygen added to the pickling solution will react with nitrous acid to form nitric acid.

10. The method as claimed in claim 1 wherein the pickling acid vapors are selected from the group consisting of hydrofluoric acid and nitric acid.

11. The method as claimed in claim 1 wherein the controlled manner in which the oxygen is added is selected from the group consisting of oxidation reduction potential using on-line instrumentation of the pickling solution and by measuring the level of nitrogen oxides in the gaseous exhaust stream.

12. The method as claimed in claim 1 wherein the nitrogen oxides are $NO_2$.

13. The method as claimed in claim 1 wherein the vapors of pickling acid and depleted nitric acid products are collected and conveyed by a hood and duct assembly.

14. The method as claimed in claim 1 wherein the first scrubbing system is a wet scrubbing system with a caustic or alkaline solution.

15. The method as claimed in claim 1 wherein an ozone generator is in fluid communication with the duct.

16. The method as claimed in claim 1 wherein the ozone is injected into the duct in a range of about 2% to about 12% by weight ozone.

17. The method as claimed in claim 1 wherein the amount of ozone injected is controlled by measuring nitrogen oxides concentration upstream of ozone injection and downstream of the second scrubbing system.

18. The method as claimed in claim 1 wherein the second scrubbing system is a wet scrubbing system with a caustic or alkaline solution.

19. The method as claimed in claim 1 wherein the ozone is present in the duct for a time sufficient to convert the nitrogen oxides to $N_2O_5$.

20. A method for removing contaminants from an effluent stream from a metal pickling operation comprising the steps:
    a) injecting a measured amount of gaseous oxygen into a pickling solution in the metal pickling operation wherein the oxygen will oxidize the reaction products of nitric acid and metal in the pickling solution forming nitrogen oxides and regenerate the nitric acid;
    b) adding additional oxygen into the pickling solution to further reduce the depletion of nitric acid in the pickling solution;
    c) adding gaseous oxygen to the effluent stream which comprises pickling acid vapors and the nitrogen oxides formed in step a) wherein the gaseous oxygen is added in a controlled manner;
    d) collecting and conveying the effluent stream to a duct;
    e) injecting ozone into the duct thereby mixing the effluent stream and ozone to oxidize the nitrogen oxides; and
    f) feeding the effluent stream to a first scrubbing system wherein acid gas and nitrogen oxides are removed from the effluent stream.

21. The method as claimed in claim 20 wherein the pickling bath comprises nitric acid and hydrofluoric acid.

22. The method as claimed in claim 20 wherein the measured amount of gaseous oxygen injected into the pickling solution is determined by a method selected from the group consisting of at least one fourth in weight of $HNO_3$ consumed otherwise in the pickling operation or one third of NOx in weight arising from the pickling bath, whichever is less.

23. The method as claimed in claim 20 wherein the reaction products of nitric acid are nitrous acid.

24. The method as claimed in claim 20 wherein the nitrous acid reacts with oxygen dissolved in the pickling solution to regenerate nitric acid.

25. The method as claimed in claim 20 wherein the gaseous oxygen is injected into the pickling solution at high pressure.

26. The method as claimed in claim 20 wherein the gaseous oxygen is injected into the pickling solution through a venturi device.

27. The method as claimed in claim 20 wherein the additional oxygen is soluble in the pickling solution.

28. The method as claimed in claim 20 wherein the additional oxygen added to the pickling solution will react with nitrous acid to form nitric acid.

29. The method as claimed in claim 20 wherein the pickling acid vapors are selected from the group consisting of hydrofluoric acid and nitric acid.

30. The method as claimed in claim 20 wherein the controlled manner in which the oxygen is added is selected from the group consisting of oxidation reduction potential using on-line instrumentation of the pickling solution and by measuring the level of nitrogen oxides in the gaseous exhaust stream.

31. The method as claimed in claim 20 wherein the nitrogen oxides are $NO_2$.

32. The method as claimed in claim 20 wherein the vapors of pickling acid and depleted nitric acid products are collected and conveyed by a hood and duct assembly.

33. The method as claimed in claim 20 wherein the first scrubbing system is a wet scrubbing system with a caustic or alkaline solution.

34. The method as claimed in claim 20 wherein an ozone generator is in fluid communication with the duct.

35. The method as claimed in claim 20 wherein the ozone is injected into the duct in a range of about 2% to about 12% by weight ozone.

36. The method as claimed in claim 20 wherein the amount of ozone injected is controlled by measuring nitrogen oxides concentration upstream of ozone injection and downstream of the second scrubbing system.

37. The method as claimed in claim 20 wherein the ozone is present in the duct for a time sufficient to convert the nitrogen oxides to $N_2O_5$.

38. A method for removing contaminants from an effluent stream from nitric acid based oxidation of chemicals selected from the group consisting of inorganic and organic chemicals process comprising the steps:
   a) injecting a measured amount of gaseous oxygen into a solution in the nitric acid based oxidation process wherein the oxygen will oxidize the reaction products of nitric acid and the chemicals in the solution forming nitrogen oxides and regenerate the nitric acid;
   b) adding additional oxygen into the solution to further reduce the depletion of nitric acid in the solution;
   c) adding gaseous oxygen to the effluent stream which comprises acid vapors and the nitrogen oxides formed in step a) wherein the gaseous oxygen is added in a controlled manner;
   d) collecting and conveying the effluent stream to a first scrubbing system wherein acid gas and nitrogen oxides are removed from the effluent stream;
   e) conveying the effluent stream by way of a duct to a second scrubbing system;
   f) injecting ozone into the duct between the first scrubbing system and the second scrubbing system, thereby mixing with the effluent stream to oxidize the remaining nitrogen oxides; and
   g) scrubbing the oxidized nitrogen oxides in the effluent stream in the second scrubbing system.

39. The method as claimed in claim 38 wherein the measured amount of gaseous oxygen injected into the solution is determined by a method selected from the group consisting of at least one fourth in weigh of $HNO_3$ consumed otherwise in the oxidation process or one third of $NO_x$ in weight arising from the oxidation vessel, whichever is less.

40. The method as claimed in claim 38 wherein the reaction products of nitric acid are nitrous acid.

41. The method as claimed in claim 38 wherein the nitrous acid reacts with oxygen dissolved in the solution to regenerate nitric acid.

42. The method as claimed in claim 38 wherein the nitrous acid reacts with oxygen dissolved in the solution to regenerate nitric acid.

43. The method as claimed in claim 38 wherein the gaseous oxygen is injected into the solution at high pressure.

44. The method as claimed in claim 38 wherein the gaseous oxygen is injected into the solution through a venturi device.

45. The method as claimed in claim 38 wherein the additional oxygen is soluble in the solution.

46. The method as claimed in claim 38 wherein the additional oxygen added to the solution will react with nitrous acid to form nitric acid.

47. The method as claimed in claim 38 wherein the acid vapors are nitric acid.

48. The method as claimed in claim 38 wherein the controlled manner in which the oxygen is added is selected from the group consisting of oxidation reduction potential using on-line instrumentation of the solution and by measuring the level of nitrogen oxides in the gaseous exhaust stream.

49. The method as claimed in claim 38 wherein the nitrogen oxides are $NO_2$.

50. The method as claimed in claim 38 wherein the vapors of acid and depleted nitric acid products are collected and conveyed by a hood and duct assembly.

51. The method as claimed in claim 38 wherein the first scrubbing system is a wet scrubbing system with a caustic or alkaline solution.

52. The method as claimed in claim 38 wherein an ozone generator is in fluid communication with the duct.

53. The method as claimed in claim 38 wherein the ozone is injected into the duct in a range of about 2% to about 12% by weight ozone.

54. The method as claimed in claim 38 wherein the amount of ozone injected is controlled by measuring nitrogen oxides concentration upstream of ozone injection and downstream of the second scrubbing system.

55. The method as claimed in claim 38 wherein the second scrubbing system is a wet scrubbing system with a caustic or alkaline solution.

56. The method as claimed in claim 38 wherein the ozone is present in the duct for a time sufficient to convert the nitrogen oxides to $N_2O_5$.

\* \* \* \* \*